M. McDEVITT
Fruit-Gatherer.
No. 160,341. Patented March 2, 1875.
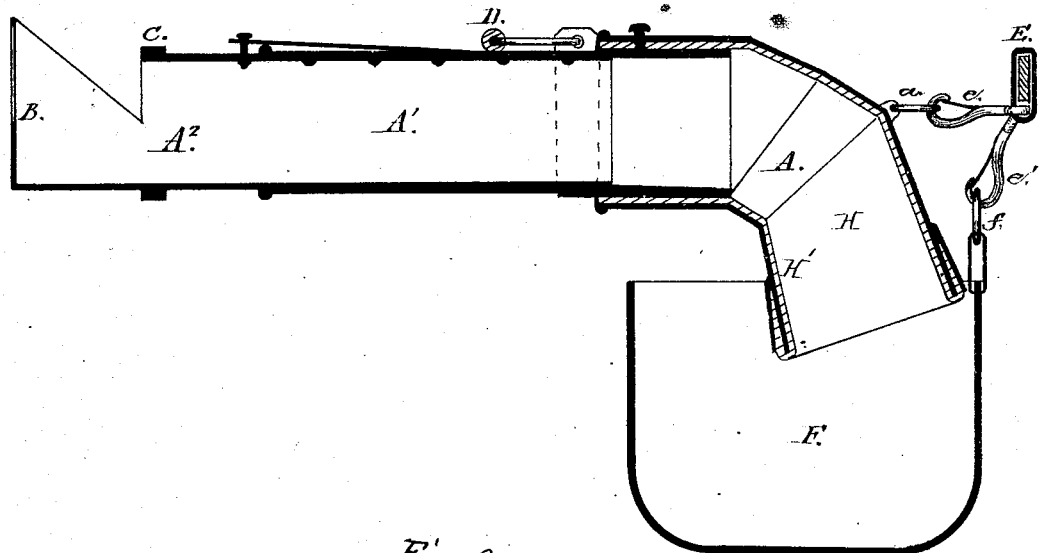
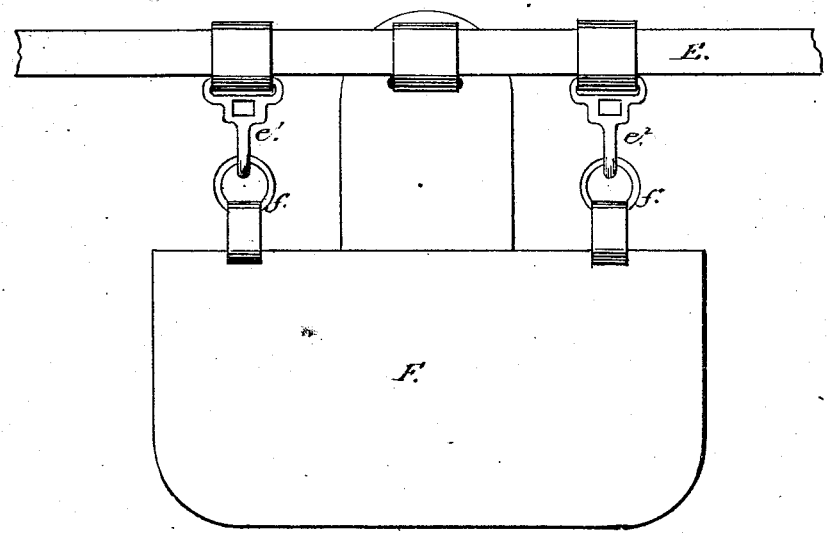
WITNESSES
INVENTOR
Martin McDevitt
By H. Clay Smith
ATTORNEY

UNITED STATES PATENT OFFICE.

MARTIN McDEVITT, OF HAMPTON, VIRGINIA.

IMPROVEMENT IN FRUIT-GATHERERS.

Specification forming part of Letters Patent No. 160,341, dated March 2, 1875; application filed January 9, 1875.

*To all whom it may concern:*

Be it known that I, MARTIN McDEVITT, of Hampton, in the county of Elizabeth City and State of Virginia, have invented certain new and useful Improvements in Fruit-Gatherers, of which the following is a specification:

I furnish an implement which will allow the operator to stand upon the ground and approach the tree from any desirable point, which will pluck the fruit, and convey the same without injury to the operator, or to the receptacle suspended from the waist of the operator. I provide a cushioned elbow to check the speed of the approaching fruit, and allow it to gently fall, or be placed by the operator, into the receptacle or basket which he carries with him, attached to a belt around his waist by spring snap-hooks, or other desirable means.

My invention consists, first, in a hollow tube, made in sections and in a closed condition, and having a severing-hook at the upper extremity, the sections being concentric to each other. The sections are arranged telescopically, and the implement may be adjusted to any desirable length at will by the operator, the sections being held in the desired position by means of spring-pawl and ratchet, spring-pin and holes, as shown, or by any other well-known and desirable means. Second, in a body which comprises one of the sections, and which, for a portion of its length, is bent at an angle, for the purpose of checking the speed of the falling fruit. The inner surface of this portion is lined with any soft, flexible, or elastic material, such, for instance, as flannel, rubber, &c., to prevent injury to the fruit when it collides therewith. Third, in a movable handle attached to the body, or any other portion of the implement, so as to be within arm's-length of the operator. Preferably this attachment is made by means of a band which surrounds the hollow tubes with sufficient friction to hold it in the desired position, but capable of being moved by reasonable force to any desired location, and to this band the handle is attached. By this means the operator is enabled to change the position of his hands and rest either arm, which to him is an important feature.

In the accompanying drawings, which form a part of this specification, Figure 1 represents a longitudinal section, showing the sections in a partially-closed condition, and the implement and basket attached to the belt. Fig. 2 is a front elevation.

I denominate my invention the "Telescopic Fruit-Gatherer."

Referring to the drawings, A $A^1$ $A^2$ constitute the hollow tube, A being the body, having the bent portion H, which is suitably lined with soft flexible material, as shown at H'. $A^1$ is a section of slightly smaller diameter, and $A^2$ another section. They are each concentric, and the part $A^2$ operates inside the part $A^1$. The parts $A^1$ $A^2$ are preferably about six (6) feet in length, and of diameter sufficient to allow the passage of the fruit. The material I prefer is light tin, which will weigh about seven ounces to the running foot when the tube is of sufficient diameter to allow the passage of the largest fruit, say four (4) inches. The part $A^3$ may be provided with a ratchet running longitudinally therewith, and the part $A^1$ with a spring-pawl, which operates therein. I have shown a spring-pin on the part $A^1$ and holes on the part $A^2$, into which holes the spring-pin engages; but any analogous device that will answer the purpose may be used without departing from the principle of my invention.

The body A and the part $A^1$ may be made in one, if desired, and the length or diameter of either or both may be varied to suit.

*a* represents a ring, which is attached to the body A, and which engages with the hook on the belt, which will be hereinafter described. B represents the knife, which is formed at any angle with the plane of the implement, and it is made with several V-shaped openings, each side of which is provided with a cutting-edge. The widest portion of these V-shaped openings is not sufficiently wide to admit any of the fruit, and they are so constructed as to readily engage with the fruit-stem. The upper surface of this knife has no cutting-edge, and may be made round or blunt in any manner, so as not to injure or abrade the fruit. C represents a flexible fender or cushion, of rubber or other desirable material, which covers the outer upper edge of the part $A^2$, to prevent the injury to the fruit from collision therewith. D represents the handle, secured to a band which surrounds the implement at any convenient distance from the operator. This band bears upon the hollow tube with just sufficient friction to allow the manipulation of the implement, but sufficiently loose to allow it to be forced around far enough to allow the operator to change hands to rest either arm, or for any other purpose. E is a belt, calculated to surround the waist of the operator, and it is provided with three (3) snap-hooks, $e$ $e^1$ $e^2$, the center hook being adapted to receive the ring $a$ on the body A of the implement, and the two outer ones to engage with corresponding rings on the basket or receptacle. F is a basket or other desirable receptacle of any desirable capacity, and it is provided with two rings, $f\,f$, which are adapted to engage with the hooks $e^1$ $e^2$ on the belt E. By this arrangement the basket is suspended from the waist of the operator in a convenient position.

I do not confine myself to the precise construction described, as the same may be varied in many instances without departing from the principle of my invention, the nature of which is obvious from the foregoing description.

I am aware that many devices have been proposed, some of which are capable of adjustment, and some even provide a channel from the tree to the operator; but in no case has the continuous channel and implement been embodied in the same instrument, and that single instrument been capable of adjustability. In all such cases that have come to my knowledge the vehicle has been of cloth or netting, which is impracticable for the purpose, being certain to catch on the twigs, &c., as is obvious. With my device I can approach any portion of the tree with little or no inconvenience, and the inner surface of my implement may be made so as not to injure the fruit in any manner.

The operation of my implement is obvious. The belt is applied to the waist of the operator, and the basket suspended therefrom. The operator then adjusts the implement so as to gather the fruit on the lower limbs, or any other portion, and engages the ring $a$ with its appropriate hook on the belt. Grasping the handle with one hand, he raises it until an apple or pear, or the like, drops into the aperture behind the knife. The knife cuts the stem. The fruit passes down the tube. Its speed is checked, without injury, by the cushion, and it either drops into the basket, or the operator catches it in his unemployed hand and gently lays it in the basket.

Having thus described my invention, what I claim is—

1. The fruit-gatherer herein described, composed of two or more tubes sliding one within another, provided with means for securing the same in any desired adjustment, and having a suitable severing device, B, at its upper extremity, as and for the purposes described.

2. The fruit-gatherer herein described, having the curved body, cushioned as shown, to prevent injury to and check the speed of the approaching fruit, as shown and specified.

3. The movable handle D, adapted to serve on the body A, and allow the operator to change hands at will, as specified.

In testimony that I claim the foregoing I have hereunto set my hand this 9th day of January, 1875.

MARTIN McDEVITT.

Witnesses:
H. CLAY SMITH,
CHAS. P. WEBSTER.